(12) United States Patent
Davis (10) Patent No.: US 12,290,013 B2
(45) Date of Patent: May 6, 2025

(54) PERFORATOR QUICK DISCONNECT SYSTEM

(71) Applicant: AmTech International, Freehold, NJ (US)

(72) Inventor: Von Davis, Freehold, NJ (US)

(73) Assignee: AmTech International, Freehold, NJ (US)

( * ) Notice: Subject to any disclaimer, the term of this patent is extended or adjusted under 35 U.S.C. 154(b) by 329 days.

(21) Appl. No.: 17/748,395

(22) Filed: May 19, 2022

(65) Prior Publication Data

US 2023/0371415 A1 Nov. 23, 2023

(51) Int. Cl.
*A01B 45/02* (2006.01)
*A01B 37/00* (2006.01)
*A01B 1/24* (2006.01)

(52) U.S. Cl.
CPC ............ *A01B 45/023* (2013.01); *A01B 37/00* (2013.01); *A01B 1/243* (2013.01)

(58) Field of Classification Search
CPC ....... A01B 45/023; A01B 1/243; A01B 37/00; A01B 1/165; A01B 35/12; A01B 1/222; A01B 1/22; E02F 9/2833
See application file for complete search history.

(56) References Cited

U.S. PATENT DOCUMENTS

| | | | | |
|---|---|---|---|---|
| 939,019 | A * | 11/1909 | Hartwell | A01B 1/22 403/379.2 |
| 3,598,068 | A * | 8/1971 | Rosendahl | A01B 33/065 175/207 |
| D242,737 | S | 12/1976 | van der Lely et al. | |

(Continued)

FOREIGN PATENT DOCUMENTS

| | | | | |
|---|---|---|---|---|
| CN | 112970725 | A * | 6/2021 | ............ A01M 21/02 |
| DE | 102010035566 | A1 * | 3/2012 | ............ A01B 45/023 |

OTHER PUBLICATIONS

The Grassgroup, The Grass Group blog, Oct. 25, 2017, [online],[retrieved on Jun. 1, 2022]. 1 pg. Retrieved from Grass Group website: <https://www.thegrassgroup.com/grassgroup-blog/?tag=tines>.

(Continued)

*Primary Examiner* — Christopher J Sebesta
*Assistant Examiner* — Blake E Scoville
(74) *Attorney, Agent, or Firm* — Lerner David LLP (57) ABSTRACT

A perforator quick disconnect system for an aerator device includes a perforator and a retaining device. The perforator has a head with an exterior configured to be received within a mounting block of the aerator device and a female component that extends into the exterior of the head. The retaining device has a connector configured to connect to the mounting block and a male component disposed within the connector and moveable relative thereto from a first position to a second position. The female and male components together form a quick disconnect mechanism such that when the perforator and retaining device are received by the mounting block, the male component engages the female component when the male component is in the first position to connect the retaining device to the mounting block and disengages the female component when in the second position to disconnect the perforator from the mounting block.

14 Claims, 8 Drawing Sheets

(56) References Cited

U.S. PATENT DOCUMENTS

| | | | |
|---|---|---|---|
| D243,207 S | 1/1977 | Van der Lely | |
| D243,275 S | 2/1977 | van der Lely | |
| D243,708 S | 3/1977 | van der Lely et al. | |
| D245,910 S | 9/1977 | Van Der Lely | |
| D246,457 S | 11/1977 | Van Der Lely | |
| D246,716 S | 12/1977 | Van Der Lely | |
| D250,714 S | 1/1979 | Van Der Lely | |
| D263,233 S | 3/1982 | van der Lely | |
| D300,223 S | 3/1989 | Livingstone | |
| 5,495,895 A * | 3/1996 | Sakamoto | A01B 45/023 111/170 |
| 5,868,206 A | 2/1999 | Miller | |
| 6,517,242 B1 | 2/2003 | Buchman | |
| 6,945,332 B2 | 9/2005 | Uehara | |
| D541,936 S | 5/2007 | Patterson | |
| 7,234,535 B2 * | 6/2007 | Faltysek | A01B 45/023 172/111 |
| 7,600,573 B2 * | 10/2009 | Langworthy | A01B 45/023 172/22 |
| D638,862 S | 5/2011 | Kobayashi et al. | |
| D655,725 S | 3/2012 | Lewis | |
| 8,251,606 B2 * | 8/2012 | Blanchard | A01D 34/82 403/322.2 |
| D720,042 S | 12/2014 | Walsh | |
| 8,979,438 B2 | 3/2015 | Maas | |
| D750,748 S | 3/2016 | Penkkimäki | |
| D753,193 S | 4/2016 | Jasper | |
| 9,516,800 B2 | 12/2016 | Maas | |
| D857,756 S | 8/2019 | Rhode et al. | |
| D857,757 S | 8/2019 | Rhode et al. | |
| D857,758 S | 8/2019 | Rhode et al. | |
| D857,759 S | 8/2019 | Rhode et al. | |
| D857,760 S | 8/2019 | Rhode et al. | |
| D859,476 S | 9/2019 | Rhode et al. | |
| D859,477 S | 9/2019 | Rhode et al. | |
| D911,397 S | 2/2021 | Faust et al. | |
| D969,576 S | 11/2022 | Maas | |
| D986,295 S | 5/2023 | Davis | |
| 2005/0167126 A1 | 8/2005 | Uehara | |
| 2009/0166049 A1 | 7/2009 | Gamble | |
| 2009/0173508 A1 * | 7/2009 | Langworthy | A01B 45/023 172/21 |
| 2011/0278031 A1 * | 11/2011 | Kobayashi | A01B 45/023 172/22 |
| 2021/0378159 A1 | 12/2021 | Sakamoto et al. | |

OTHER PUBLICATIONS

Toro 2019-2020, Titan Tines Catalog, 2019, [online], [retrieved on Jun. 1, 2022]. 28 pgs. Retrieved from Toro website: <https://cdn2.toro.com/en/-/media/Files/Toro/Page/Parts/2019-2020-Tines-Catalog-Non-Priced.ashx>.

Extracted pages from 2022 Par West Product Catalog, ParWestTurf, printed Jan. 2022, [online], [retrieved on Jun. 1, 2022]. 13 pgs. Retrieved from Par West website: <https://parwest.com/wp-content/uploads/2022-Par-West-Product-Catalog-compressed-1.pdf> (pp. 1-3, 185-193, 238).

Davis, V., U.S. Appl. No. 29/840,650, filed May 31, 2022, entitled "Tine".

* cited by examiner

PERFORATOR QUICK DISCONNECT SYSTEM

BACKGROUND OF THE INVENTION

Aeration is an important component to groundskeeping, turf growth and maintenance, gardening, farming, and the like as it helps loosen compacted soil allowing for water and nutrients to more effectively reach the roots of grasses and other plant life. Aeration equipment can be as simple as shoes with perforators extending from their sole or as sophisticated as self-propelled or tractor driven machines that deploy a large array of perforators that are driven into the soil through rotary and/or reciprocating mechanisms. Regardless of the mechanisms of deployment, aeration almost invariably involves a perforator, such as a tine, knife, blade and the like, that cyclically perforates or penetrates soil.

Such cyclical perforation ultimately results in the wearing-out or failure of a perforator thereby requiring its replacement. In this regard, an operator may be required to replace an entire network of perforators on an aerator machine several times before an entire aeration operation is completed depending on the overall scale of the job. For example, an operator may have to replace each perforator on an aerator machine, which may carry dozens of perforators, two or three times while aerating an 18-hole golf course. This typically involves the use of extraneous tools, such as wrenches, which are manipulated into hard-to-reach locations that are often obscured by mud, dirt, and the like in order to loosen and tighten threaded fasteners that secure the perforators. Such routine maintenance usually results in a significant amount of equipment downtime, labor, and expense. Although it is desirable to develop alternative mounting solutions that simplify and quicken this process, at least one challenge to such advances is ensuring a sufficiently strong connection as each perforator is typically subjected to repeated and significant axial and bending loads. As such, further developments are desirable.

BRIEF SUMMARY OF THE INVENTION

In one aspect of the present disclosure, a perforator quick disconnect system for retrofitting a mounting block of an aerator device includes a perforator that includes a body, a tip extending from an end of the body, and a head extending from another end of the body. The head has an exterior dimensioned to be received within the mounting block and a female component extending into the exterior of the head. The system also includes a retaining device that has a connector configured to connect to the mounting block and a male component disposed at least partially within the connector and moveable relative thereto from a first position to a second position. The female component of the perforator and the male component of the retaining device together form a quick disconnect mechanism such that, when the perforator and retaining device are received by the mounting block, movement of the male component from the second position to the first position secures the retaining device to the mounting block.

Additionally, the male component may be spring biased toward the first position. The perforator may include an axial opening extending through the tip and into the body. The system may also include an O-ring. The head of the perforator may include a groove configured to receive a portion of the O-ring.

Continuing with this aspect, the female component may include a first groove extending in a first direction and a second groove extending in a second direction. The first direction may be a proximal-distal direction, and the second direction may be perpendicular to the first direction. The second groove may be arcuate and may extend about an axis of curvature parallel to or coaxial with a longitudinal axis of the head. The female component may include a first and second depression. The first depression may be located at an intersection between the first and second grooves. The second depression may be located at an end of the second groove opposite that of the first depression. The first and second depressions may each have a depth greater than a depth of the second groove. The male component may include a plunger biased in the first position and may be configured to travel through the female component. The depths of the first and second grooves and first and second depressions relative to one another may be such that the plunger is in the second position when located within the first and second grooves and in the first position when located within the first and second depressions.

Also, the female component may include a through-opening extending through the head, and the male component may include a pin receivable within the through-opening. The through-opening may also include an aperture and an annular groove. The annular groove may have a larger dimension than the aperture. The male component may further include a hollow shaft and a ball. The pin may be slidably disposed within the hollow shaft, and the ball may be radially moveable relative to the hollow shaft.

Further, the female component may include a groove extending circumferentially about a longitudinal axis of the head. The connector may include a threaded shaft and a housing extending from the threaded shaft. The male component may include a piston housed within the housing and moveable relative thereto between the first and second positions. The piston may be biased toward the first position. The piston may include a C-shaped end effector configured to be received within the groove of the perforator.

In another aspect of the disclosure, a perforator quick disconnect system for retrofitting to a mounting block of an aerator device includes a perforator that includes a body, a tip extending from an end of the body, and a head extending from another end of the body. The head has an exterior dimensioned to be received within the mounting block and a female component extending into the exterior of the head. The system also includes a retaining device that has a first end portion configured to be received within the mounting block and a male component moveable relative to the first end portion between a first position and a second position. The female component of the perforator and the male component of the retaining device together form a quick disconnect mechanism such that, when the perforator and retaining device are received by the mounting block, movement of the male component from the second position to the first position secures the retaining device to the mounting block.

Additionally, the female component may include an L-shaped groove. Also, the male component may include a spring biased plunger.

In a further aspect of the disclosure, a perforator for quick connection and disconnection with a mounting block of an aerator includes a body that includes a first end, a second end, and a length that extends between the first and second ends and defines a longitudinal axis of the body. A tip extends from the first end of the body. Also, a head extends from the second end of the body. The head has an exterior and a female component of a quick disconnect mechanism that extends into the exterior. The female component has at least a first groove that extends about an axis of rotation that extends parallel to or coaxial with the longitudinal axis of the body.

Additionally, the female component may include a second groove intersecting the first groove.

BRIEF DESCRIPTION OF THE DRAWINGS

The features, aspects, and advantages of the present invention will become better understood with regard to the following description, appended claims, and accompanying drawings in which:

DETAILED DESCRIPTION

A ground conditioning device or machine may be any known machine that is used to condition landscape, such as an aerator machine which may be a self-propelled unit or an accessory module to a tractor and the like. Such machines typically include one or more mounting blocks for mounting a plurality of perforators. Such mounting blocks are commonly connected to other machine elements that rotate and/or reciprocate the mounting blocks causing perforators mounted thereto to perforate soil.

Figure 1:
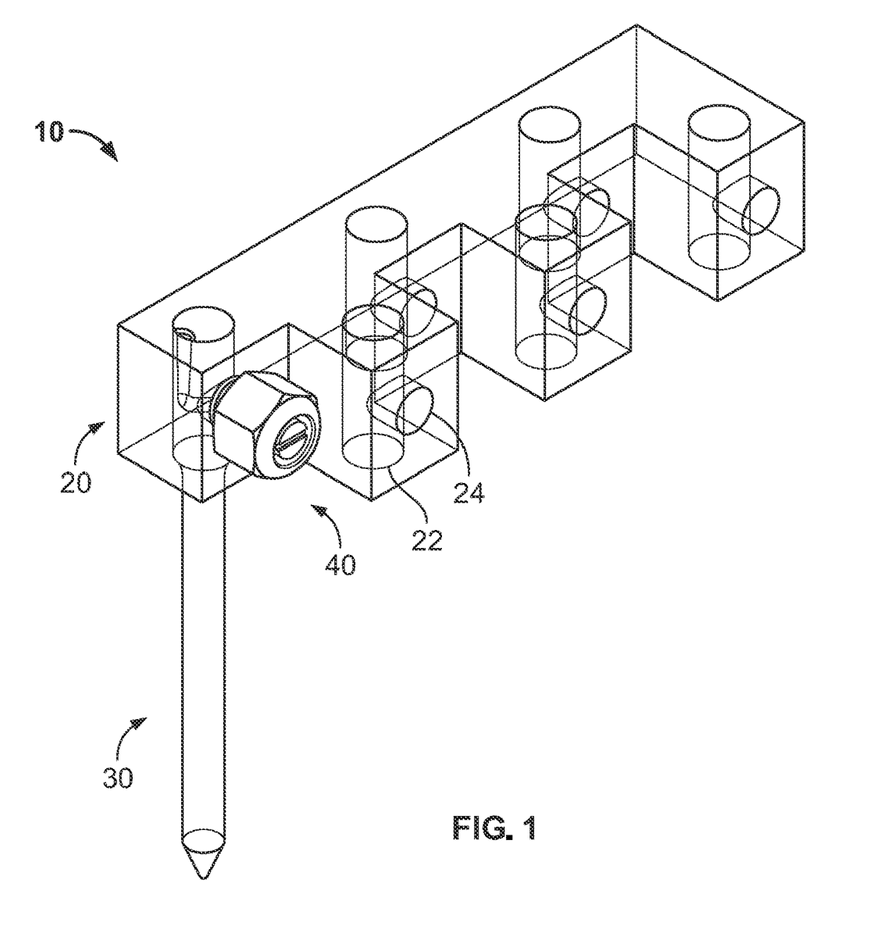
FIG. 1 is a perspective view of a mounting block and a perforator quick disconnect system according to an embodiment of the present disclosure.

FIG. 1 depicts an exemplary mounting block or mounting body 20 which includes a series of paired openings 22, 24. Each pair of openings 22, 24 includes a first opening 22 and a second opening 24. First opening 22 may be a smooth bore that extends in a first direction, and second opening 24 may be a threaded bore that extends in a transverse second direction. In other words, second opening 24 intersects first opening 22 so that respective axes thereof are oriented perpendicular to each other. Before now, a common perforator arrangement recognized in the art included a bolt threaded to second opening 24 and a perforator positioned in first opening 22. In such arrangement, when an operator wished to replace worn or broken perforators, the operator had to loosen the bolts associated with each perforator with a tool, such as a wrench, and remove each of the perforators. Then, a new perforator had to be inserted into first opening 22 and its corresponding bolt sufficiently tightened with the tool to secure the perforator before moving to the next new perforator—a time consuming and often laborious process.

The quick disconnect systems described herein alleviate the problems of such legacy systems and can each be implemented in conjunction with mounting block 20 without any modification to mounting block 20 itself. In this regard, mounting block 20 can be retrofitted with any one of the below described quick disconnect systems so that a perforator can be quickly exchanged without reliance on an extraneous tool that has to be manipulated to engage a small bolt head or the like in an already crowded and often muddy space.

Figure 2A:
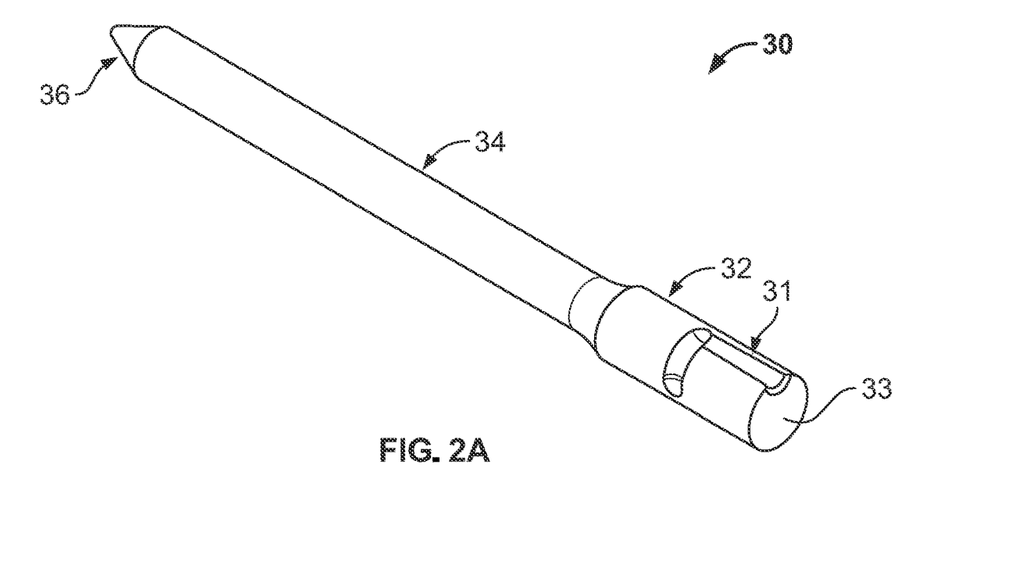
FIG. 2A is a perspective view of a perforator according to an embodiment of the present disclosure.
Figure 2B:
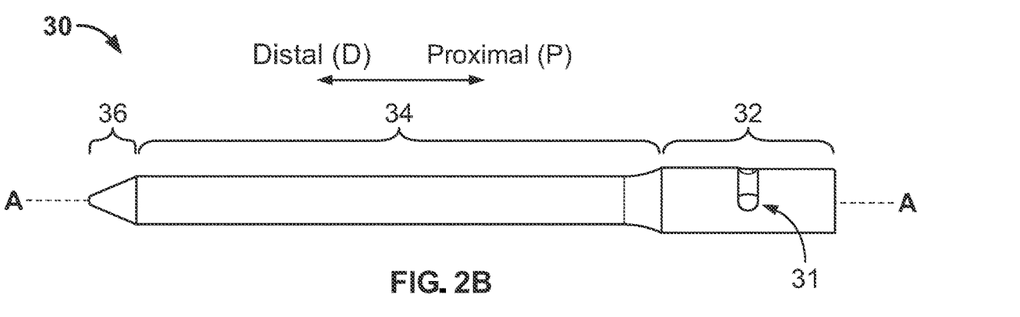
FIG. 2B is a side view of the perforator of FIG. 2A.
Figure 2C:
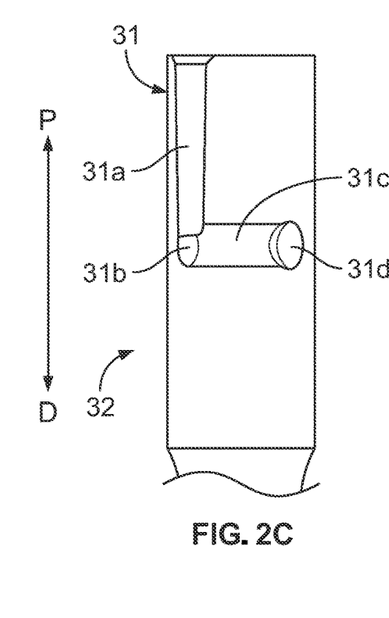
FIGS. 2C-2E are partial side views of a head of the perforator of FIG. 2A.
Figure 2D:
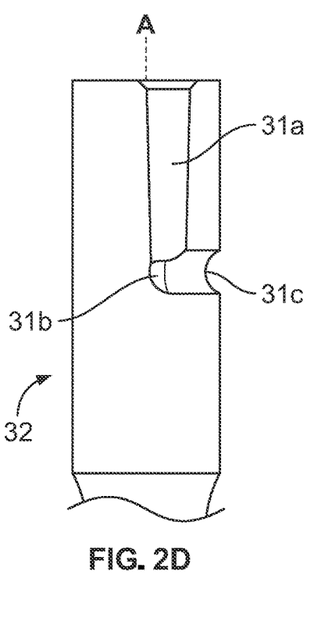
Figure 2E:
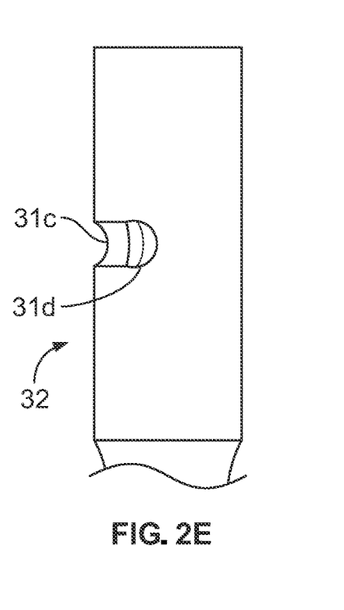
Figure 2F:
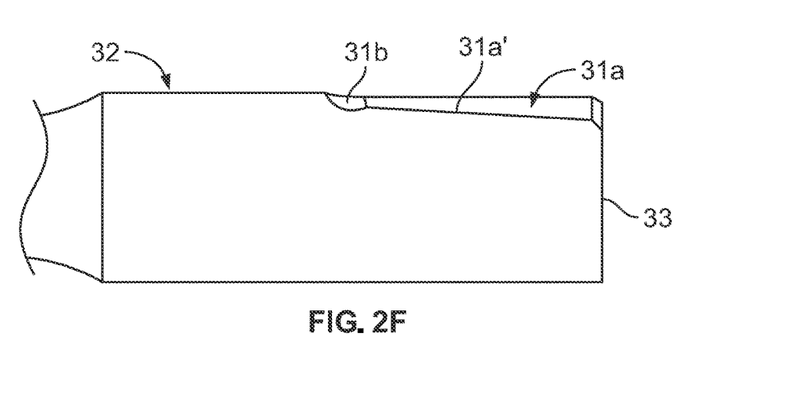
FIG. 2F is a cross-sectional view of the head of the perforator of FIG. 2A taken along a midline thereof.
Figures 3, 4, 5:
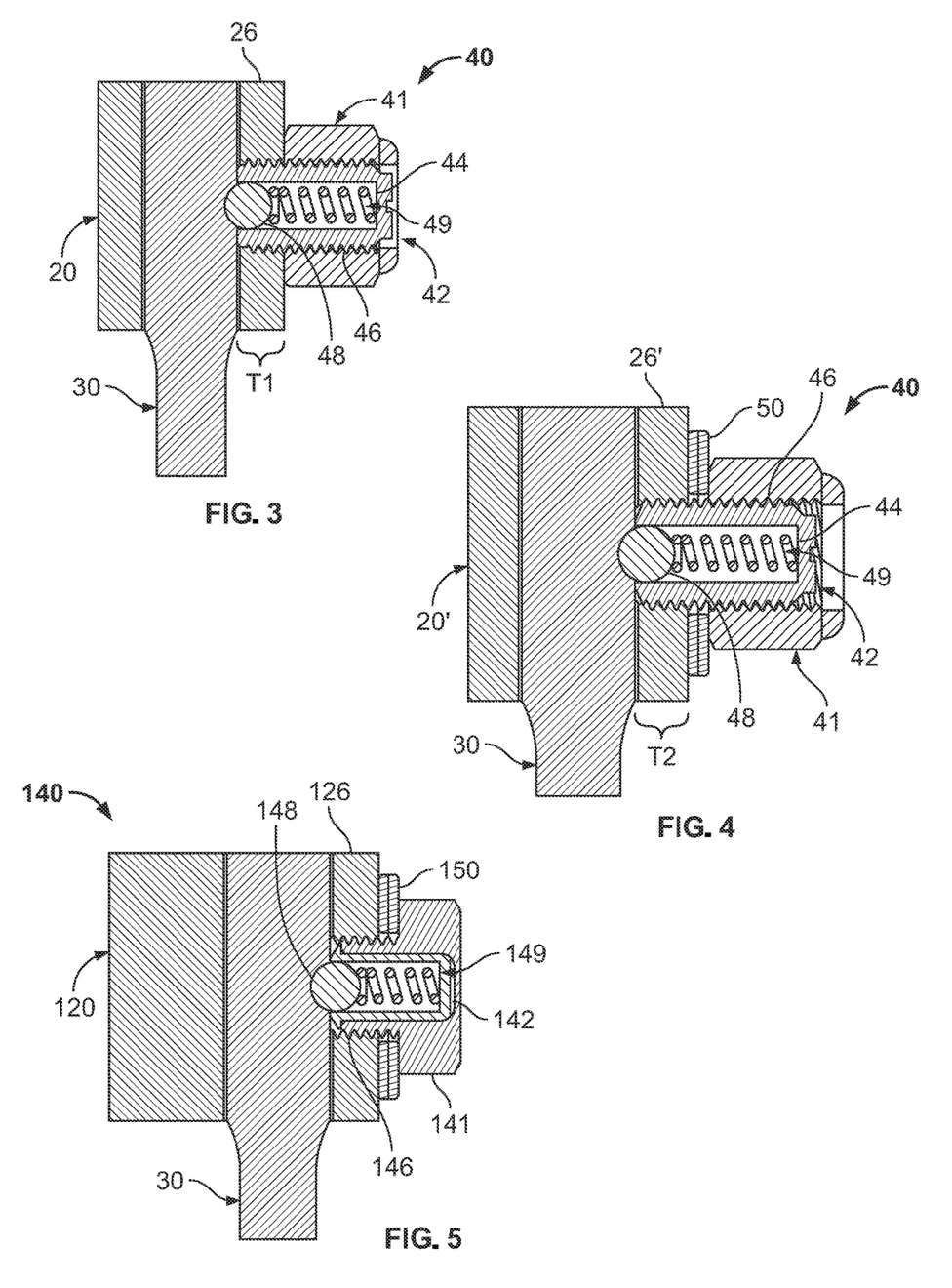
FIG. 3 is a partial cross-sectional view of the mounting block and perforator quick disconnect system of FIG. 1.
FIG. 4 is a partial cross-sectional side view of a mounting block and perforator quick disconnect system according to another embodiment of the present disclosure.
FIG. 5 is a partial cross-sectional side view of a mounting block and perforator quick disconnect perforator according to another embodiment of the present disclosure.

FIGS. 1-3 depict a perforator quick disconnect system 10 according to an embodiment of the present disclosure. System 10 generally includes a perforator 30 and a retaining device 40 that together form a quick disconnect mechanism.

FIGS. 2A-2F depict perforator 30 according to an embodiment of the present disclosure. Perforator or tine 30 is a solid perforator that includes a head 32, a body 34, and a tip 36. Body or shaft 34 constitutes a majority of a length of perforator 30 and is generally cylindrical with a circular cross-sectional shape. However, in other embodiments, body 34 can have one or more other cross-sectional shapes, such as a polygonal cross-sectional shape. For example, a knife perforator may have a generally rectangular cross-sectional shape in which two opposing sides may be flat with two other opposing sides that may be convexly curved or flat. Tip 36 extends from body 34 and forms a distal end of perforator 30. Tip 36, as shown, is conical but may have other shapes that taper down to a point.

Head 32 extends from body 34 and forms a proximal end of perforator 30. Head 32 is generally cylindrical and is configured to be received in first opening 22 of mounting block 20. In the embodiment depicted, head 32 has a larger maximum cross-sectional dimension than body 34. However, in other embodiments, head 32 and body 34 may have the same maximum cross-sectional dimension. Head 32 includes a first engagement feature or female component 31 of the quick disconnect mechanism. In the embodiment depicted, female component 31 is an L-shaped groove in an exterior of head 32. More particularly, female component 31 includes a first portion 31a, a second portion 31b, a third portion 31c, and a fourth portion 31d.

First portion 31a of female component 31 is a first elongate groove that extends through a proximal end surface 33 at a proximal end of head 32 and in a distal direction along a longitudinal axis A of perforator 30. As shown in the cross-section of FIG. 2F, first portion 31a defines a ramped or tapered surface 31a' that becomes shallower in a distal direction of travel. In addition, first portion 31a has a tapering width that becomes narrower in the distal direction of travel. In other words, a width of first portion 31a, as measured perpendicular to axis A, is greater at its proximal end than at its distal end. This effectively creates a self-centering feature which centers a male component (described below) within first portion 31a as it travels in the distal direction while making it easier for the male component to engage first portion 31a in the first instance.

Second portion 31b of female component 31 is a first concave depression, which may be semi-spherical, and lies at an intersection between first portion 31a and third portion 31c. As shown in FIG. 2F, second portion 31b is defined by an abrupt dip in elevation relative to the distal end of ramped surface 31a'. In other words, second portion 31b is deeper than a distal end of first portion 31a and therefore extends further into an exterior of head 32 toward axis A than first portion 31a. This change in elevation provides the operator tactile feedback when the male component reaches second portion 31b to let the operator know that the male component has reached the end of first portion 31a.

Third portion 31c of female component 31 is a second elongate groove which extends from second portion 31b in a transverse direction which is preferably perpendicular to axis A and also to first portion 31a. Third portion 31c also extends circumferentially about axis A or, where third portion 31c is eccentric, another center of curvature parallel to axis A. In other words, third portion 31c is arcuate such that it sweeps an arc from second portion 31b to fourth portion 31d, as best shown in FIGS. 2C-2E. Third portion 31c, similar to first portion 31a, may have a variable depth such that it becomes deeper as it extends further from second portion 31b. However, in other embodiments, third portion 31c may have a uniform depth along its length but a shallower depth than that of second portion 31b. In either embodiment, second portion 31b is deeper than third portion 31c where the two portions 31b-c meet.

Fourth portion 31d of female component 31 is a second concave depression located at a terminal end of third portion 31c opposite that of second portion 31b. In other words, fourth portion 31d is deeper than third portion 31c where the two portions 31c-d meet and therefore defines an abrupt elevation change from the depth of third portion 31c. Fourth portion 31d is generally semi-spherical and is configured to receive the male component, which as described below, may be a rounded plunger. Such change in depth helps provide tactile feedback to the operator letting the operator know that perforator 30 is secured in place. Moreover, the depth of fourth portion 31d allows the male component to secure perforator 30 from being pulled out of mounting block 20 while in use. The L-shape of female component 31 also creates a secure pathway that ensures the male component cannot retrace the pathway without deliberate action by the operator.

FIG. 3 depicts retaining device 40 according to an embodiment of the present disclosure. Retaining device 40 includes a nut 41 and a plunger assembly 42. Plunger assembly 42 defines the second engagement feature or male component 48 of the quick disconnect mechanism. In particular, plunger assembly 42 includes an externally threaded body 46 with a chamber 44 therein that contains a spring 49 and a plunger or moveable member 48. Plunger 48 (i.e., male component) is biased by spring 49 and may be in the form of a ball, such as in the embodiment depicted, or a round-nosed elongate pin, for example. Plunger 48 partially extends from one end of chamber 44 which is configured to engage female component 31 of perforator 30. Externally threaded body 46 is configured to threadedly engage second opening 24 in mounting block 20. In this regard, plunger assembly 42 is a connector of retaining device 40 which connects retaining device to mounting block 20. Nut 41 has internal threads 45 that are configured to threadedly engage threaded body 46 of plunger assembly 42 to help secure plunger assembly 42 in a desired position within mounting block 20.

Mounting block 20 can be retrofitted with system 10. In this regard, a bolt or other threaded fastener that may have previously been used may be removed from second opening 24. Plunger assembly 42 may then be driven into second opening 24 until plunger 48 partially extends into first opening 22. Nut 41 is then driven into engagement with a sidewall 26 of mounting block 20 and over plunger assembly 42 to secure plunger assembly 42 in position. Perforator 30 can then be secured to mounting block 20 via retaining device 40. In this regard, head 32 of perforator 30 is inserted into first opening 22 so that second engagement feature 48 lockingly engages first engagement feature 31. In other words, head 32 of perforator 30 is inserted axially into first opening 22 so that plunger 48 (i.e., male component) of retaining device 40 is received within first portion 31a of female component 31. As perforator 30 is continued to be moved axially, plunger 48 travels along ramped surface 31a' of first portion 31a which depresses plunger 48 further into chamber 44 from a first position to a second position within chamber 44. Once plunger 48 reaches second portion 31b, the abrupt change in depth and the spring bias of plunger 48 causes plunger 48 to snap into second portion 31b and back to the first position within chamber 44 signaling to the operator that the end of first portion 31a has been reached and that perforator 30 can now be rotated. At this point, perforator 30 is generally secured to mounting block 20 in that plunger 48 can hold perforator 30 in place without assistance. However, perforator 30 would fall out during use. Thus, perforator 30 is then rotated about axis A which causes plunger 48 to be received in third portion 31c. The shallower depth of third portion 31c once again causes plunger 48 to be depressed into chamber 44 from the first position to the second position. As perforator 30 is continued to be rotated, plunger 48 travels along third portion 31c until it reaches fourth portion 31d. Once plunger 48 reaches fourth portion 31d, the abrupt change in depth and the spring bias of plunger 48 causes plunger 48 to snap into fourth portion 31d and back to the first position within chamber 44 signaling to the operator that the end of third portion 31c has been reached and perforator 30 is secured. At this point, perforator 30 is held in place without assistance from the operator but also will not come out during use.

When it is time for perforator 30 to be removed from block 20, the operator rotates perforator 30 in an opposite direction causing plunger 48 to retrace its original path through third portion 31c to second portion 31b at which point perforator 30 can be pulled axially so that plunger 48 travels through first portion in a proximal direction thereby allowing perforator 30 to be removed from first opening 22. In this regard, several perforators 30 can be quickly exchanged without the need for extraneous tools.

The threaded arrangement between plunger assembly 42 and nut 41 allows plunger assembly 42 to adapt to different mounting blocks 20 which have different depths of second opening 22. For example, as shown in FIG. 3, a sidewall 26 of mounting block 20 has a thickness T1 which corresponds to a depth of second opening 22. However, as shown in FIG. 4, a different mounting block 20' has a sidewall 26' with a wall thickness T2 which is less than T1. Retaining device 40 can be adapted to either mounting block 20 or mounting block 20'. In this regard, for mounting block 20', one or more washer or shim 50 may be placed between nut 41 and sidewall 26' of mounting block 20' to mimic a thicker sidewall. Plunger assembly 42 may then be axially adjusted relative to nut 41 as needed to ensure plunger 48 extends into a first opening 22. Washer 50 can be a wedge lock washer, spring lock washer, and the like. Moreover, washer 50 can even be used with mounting block 20 to help plunger assembly 42 resist vibrations imposed on it so that it does not back out of mounting block 20. The added thickness provided by washer 50 in that regard can be overcome in the same manner as that in FIG. 4 by adjusting the axial position of plunger assembly 42 relative to nut 41.

FIG. 5 depicts a retaining device 140 according to another embodiment of the present disclosure. For ease of review, like elements are accorded like reference numerals to that of retaining device 40, but within the 100-series of numbers. Retaining device 140 is similar to retaining device 40 in that it has a plunger assembly 142 with a spring 149 and spring biased plunger 148 that forms a male component of a quick disconnect mechanism. However, unlike retaining device 40, plunger assembly 142 is press-fit into a bolt 141. Thus, plunger assembly 142 has an exterior that is configured to be press-fit within a bore in bolt 141 and therefore does not include external threads like that of plunger body 46 and is not adjustable in the manner described above. Instead, bolt 141 includes a threaded shaft 146 for connection to second opening 22 in mounting block 20. In this regard, bolt 141 acts as a connector connecting retaining device 140 to second opening 24 in block 20. Washers/shims 150 may also be utilized to adapt to differently dimensioned mounting blocks and/or to provide vibration resistance.

Figure 6A:
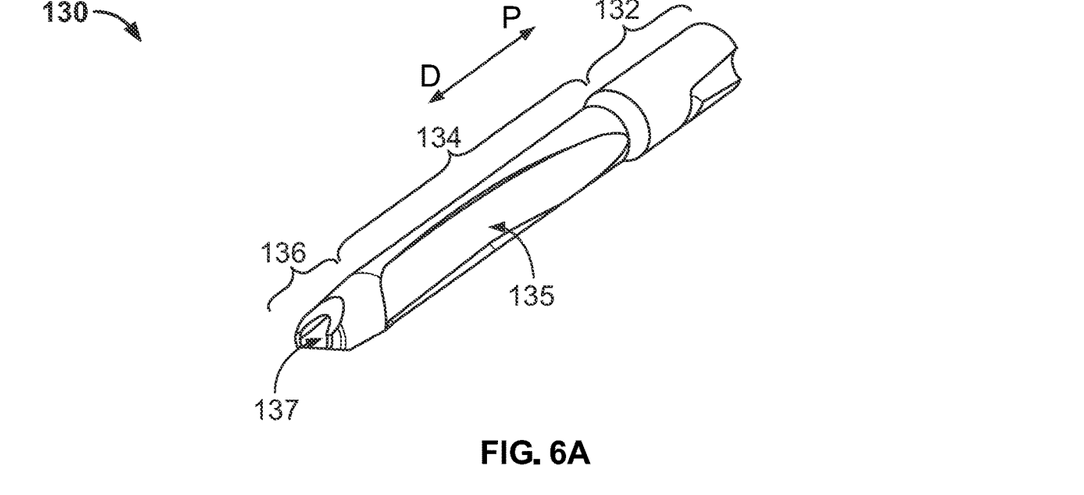
FIGS. 6A and 6B are perspective views of a perforator according to another embodiment of the present disclosure.
Figure 6B:
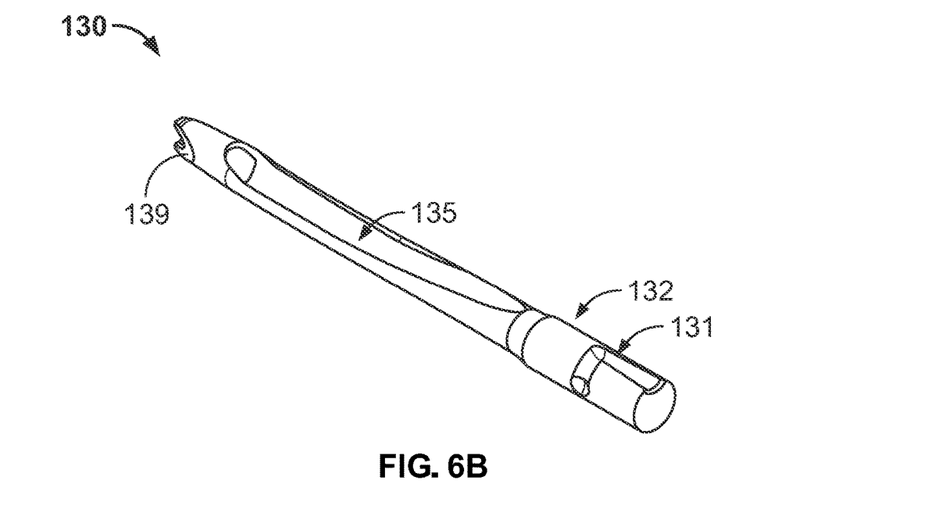
Figure 6C:
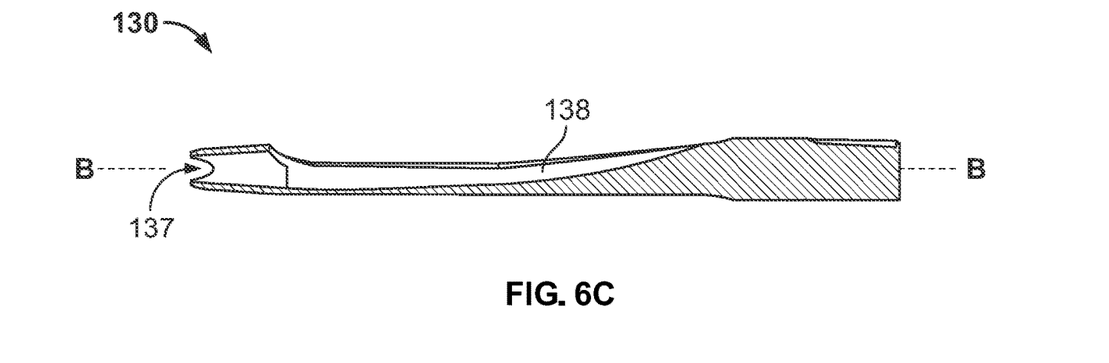
FIG. 6C is a cross-sectional view of the perforator of FIGS. 6A and 6B taken along a midline thereof.

FIGS. 6A-6C depict a perforator or tine 130 according to another embodiment of the present disclosure. For ease of review, like elements are accorded like reference numerals to that of perforator 30, but within the 100-series of numbers. For instance, perforator 130 includes a head 132, a body 134, and a tip 136. Additionally, head 132 is identical to head 32 of perforator 30 and therefore a female component 131 of head 132 is the same as female component 31 of head 30. However, perforator 130 differs from perforator 30 in that it is a side-eject coring perforator or hollow perforator. In this regard, perforator 130 has an axial opening 137 that extends through tip 136 and into body 134. In addition, body 134 has a side slot 135 extending along its length and a sloped inner surface 138 opposite side slot 135. Such sloped surface 138 slopes inwardly toward a longitudinal axis B of perforator 130 along a proximal direction of travel which helps eject a soil core from side slot 135 as the core is advanced axially in the proximal direction along opening 137. Also, in the embodiment depicted, tip 136 is cut at an angle at opposite sides of opening 137 to form a pair of serrations 139 which helps perforator penetrate compacted soil. Although perforator 130 is depicted with side slot 135 for side ejection of a soil core, it should be understood that in some embodiments, body 134 may not have side slot 134 such that opening 137 is circumferentially enclosed by body 134.

Figure 7:
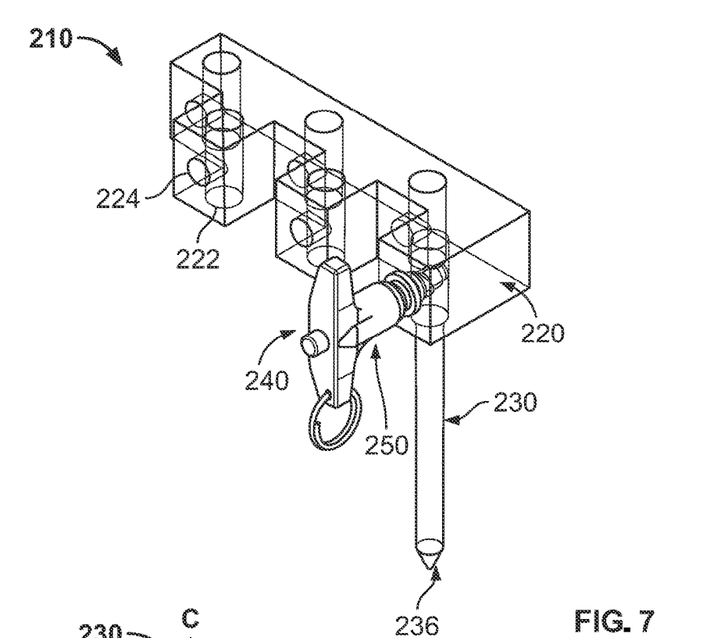
FIG. 7 is a perspective view of a mounting block and perforator quick disconnect system according to yet another embodiment of the present disclosure.
Figure 8A:
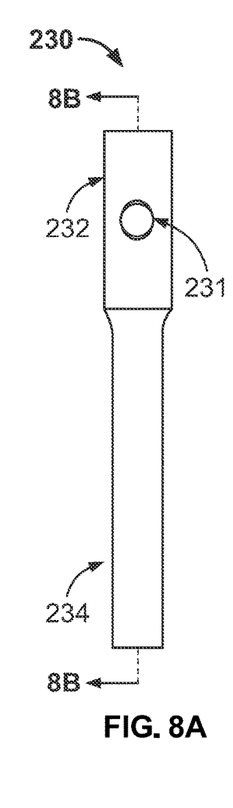
FIG. 8A is a partial side view of a perforator according to a further embodiment of the present disclosure.
Figure 8B:
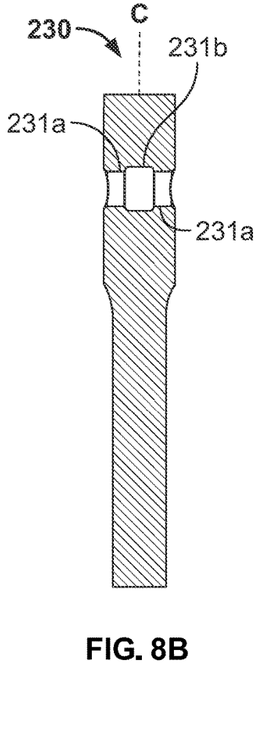
FIG. 8B is a partial cross-sectional side view of the perforator of FIG. 8A taken along a midline thereof.
Figure 9:
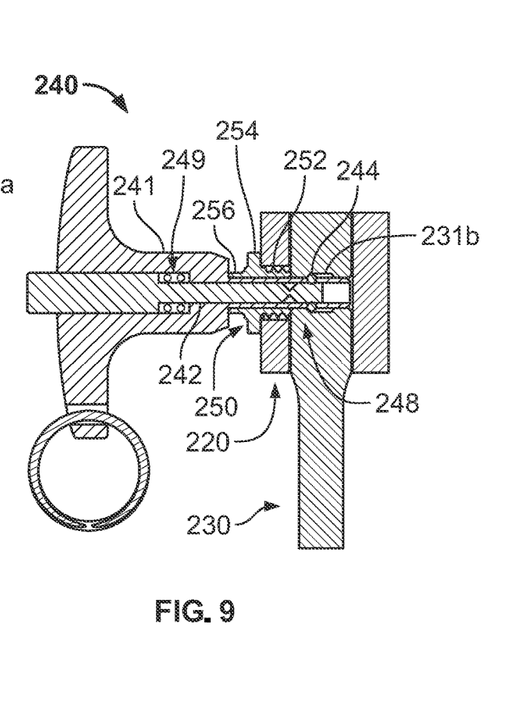
FIG. 9 is a partial cross-sectional side view of the mounting block and perforator quick disconnect system of FIG. 7.
Figure 10:
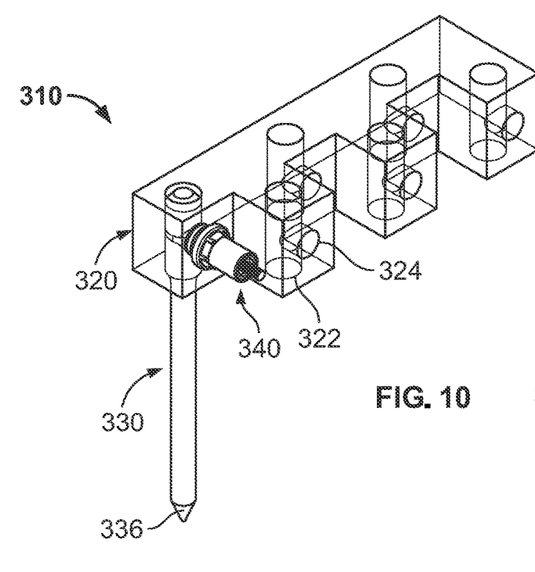
FIG. 10 is a perspective view of a mounting block and a perforator quick disconnect system according to a still further embodiment of the present disclosure.

FIGS. 7-9 depict a perforator quick disconnect system 210 according to another embodiment of the present disclosure. For ease of review, like elements are accorded like reference numerals to that of system 10, but within the 200-series of numbers. System 210 is adapted to connect to a mounting block 220, which is identical to mounting block 20, and comprises a perforator 230 and a retaining device 240, and a mounting ring 250.

Perforator 230 is like perforator 30 in that it includes a head 232, body 234, and tip 236. Additionally, head 232 includes a first engagement feature or female component 231 of a quick disconnect mechanism. However, female component 231 is a through-opening extending through head 232 in a direction transverse to a longitudinal axis C of perforator 230, as shown in FIG. 8B. Additionally, opening 231 includes an aperture 231a at opposite ends of opening 231 and an annular groove 231b located between such apertures 231a. Groove 231b has a larger diameter than apertures 231a and is generally centered within opening 231, as best shown in the cross-section of FIG. 8B.

Retaining device 240 is a quick release pin that generally includes a handle 241 and second engagement feature or male component 242, as shown in FIG. 9. Male component 248 generally includes a pin or spindle 242 that is biased by a spring 242 in handle 241, balls or spheres 244, and a hollow shaft 243. Shaft 243 extends from handle 241. Pin 242 extends through handle 241 and into shaft 243. Balls 244 are coupled to shaft 243 and are radially moveable so that in a locked configuration, pin 242 acts as a cam to push balls 244 partially out of shaft 243 in a radially outward direction. However, in an unlocked configuration and with the spring bias overcome via operator input, pin 242 disengages balls 244 so they can freely move radially inwardly into shaft 243.

A mounting ring 250 is configured to retrofit mounting block 220 for system 210. Mounting ring 220 includes a threaded shaft 252, a flange 254 and a collar 256. Threaded shaft or post 252 is configured to threadedly engage second opening 224 in block 220 while flange 254 abuts a sidewall 226 thereof to help secure mounting ring 250 in place. In this regard, mounting ring 250 serves as a modular connector or adapter of retaining device 240 which facilitates its connection to block 220. Collar 256 extends from flange 254 and operates as a depth-stop for retaining device 240, as illustrated in FIG. 9. Collar 256 and/or flange 254 may be hexagonal or the like to facilitate tool engagement for initial installation into mounting block 220. However, once installed, system 210 may be utilized without extraneous tools. A through-opening extends through mounting ring 250 and is configured to receive male component 248 and direct it toward first opening 222 in mounting block 220.

As mentioned, mounting block 220 can be retrofitted with system 210. In this regard, a bolt or other threaded fastener that may have previously been used may be removed from second opening 224. Mounting ring 250 is then engaged to second opening 224. Perforator 230 can then be secured to mounting block 210 via retaining device 240. In this regard, head 232 of perforator 230 is inserted into first opening 222 so that second engagement feature 248 can lockingly engage first engagement feature 231. In other words, head 232 of perforator 230 is inserted axially into first opening 222 so that opening 231 (i.e., female component) aligns with the opening of mounting ring 250. Thereafter, male component 248 is inserted through mounting ring 250 and into opening 231 so that balls 244 are positioned within groove 231b and handle 241 abuts collar 256 which signals to the operator that the appropriate depth has been achieved, as best shown in FIG. 9. In the locked configuration or first position of male component 248, balls 244 and the larger diameter of groove 231b prevent retaining device 240 from being disengaged from perforator 230. Where it is desirable to remove perforator 230, male component 248 is moved to an unlocked configuration or second position. In this regard, pin 242 is pushed relative to handle 240 to overcome its spring bias and disengage balls 244, at which point retaining device 240 may be removed from mounting block 220 and perforator 230 can be removed from first opening 222.

FIGS. 10-13C depict a perforator quick disconnect system 310 according to another embodiment of the present disclosure. For ease of review, like elements are accorded like reference numerals to that of system 10, but within the 300-series of numbers. System 300 is adapted to connect to a mounting block 320, which is identical to mounting block 20, and comprises a perforator 330 and a retaining device 340.

Figure 11:
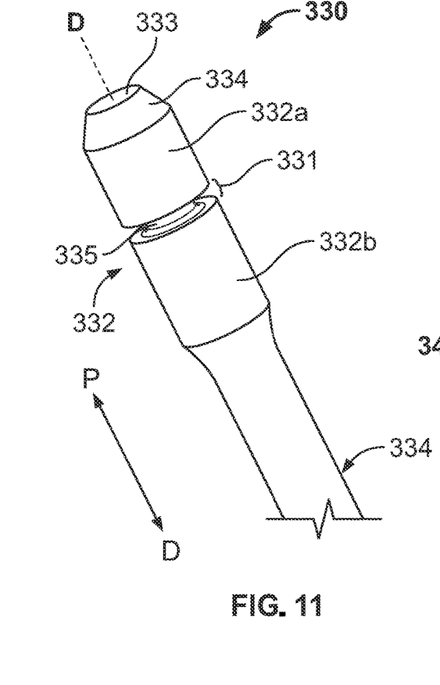
FIG. 11 is a partial perspective view of a perforator according to an even further embodiment of the present disclosure.

Perforator 330 is like perforator 30 in that it includes a head 332, body 334, and tip 336. Additionally, head 332 includes a first engagement feature or female component 331 of a quick disconnect mechanism. However, female component 331 is an annular groove extending circumferentially about a longitudinal axis D of perforator 330. Such groove 331 segments head 332 into a first head portion 332a and a second head portion 332b with an inner shaft 335 extending between them. Inner shaft 335, which is defined by groove 331, has a smaller diameter than first and second head portions 332a-b. First head portion 332a defines a proximal end of perforator 330 and includes a cam surface 334. Cam surface or chamfer 334, in the embodiment depicted, is a conical surface that tapers radially inwardly in a distal to proximal direction and intersects a proximal end surface 333 of head 332.

Figure 12A:
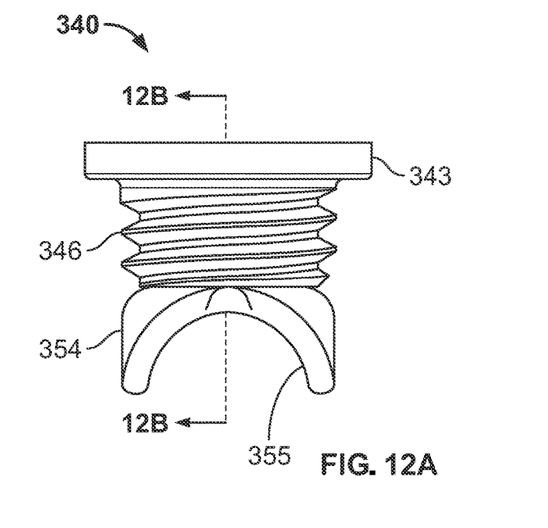
FIG. 12A is a partial top view of a retaining device of the perforator quick disconnect mechanism of the system of FIG. 10.
Figure 12B:
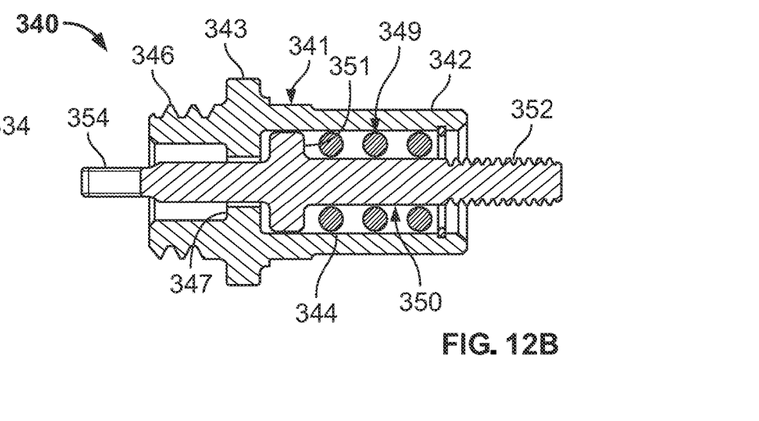
FIG. 12B is a cross-sectional view of the retaining device of the system of FIG. 12A taken along line 12B.

Retaining device 340 is a spring-loaded insert that generally includes a housing 341 and second engagement feature or male component 350. Male component 350 is a piston 350 that is biased by a spring 349. Piston 350 includes a threaded end 352, an engagement end 354, and a flange 351 positioned therebetween. Engagement end 354 is configured to engage annular groove 331 of head 332. In the embodiment depicted, engagement end 354 is defined by an end effector which is in the form of a C-shaped or crescent-shaped collar that is dimensioned to extend into groove 331 and has concavely curved surface 355 configured to conformingly bear against inner shaft 335 under the spring bias of piston 350. However, other end effectors are contemplated, such as a cylindrical shaft or the like. Threaded end 352 is threaded which helps an operator grip piston 350 with fingers or, if need be, a modular ring or knob (not shown) of the operator's choice to further enhance the operator's grip. In other embodiments, in lieu of threaded end 352, piston may define a ring sized to receive a finger for gripping and pulling piston 350.

Figure 13A:
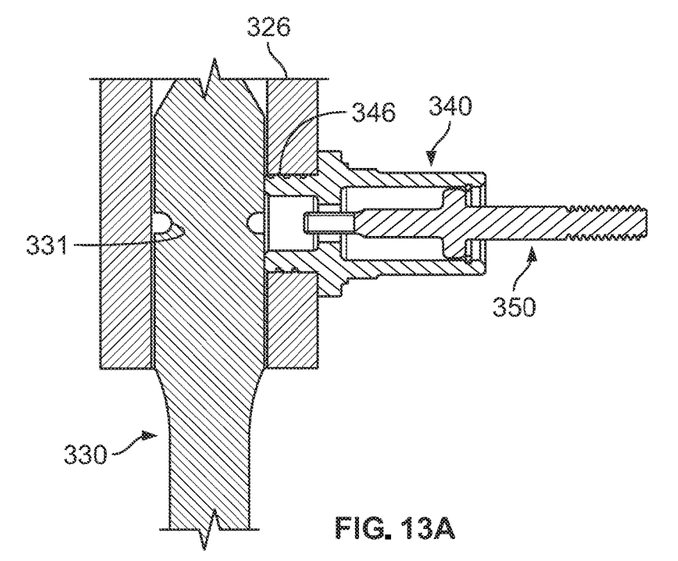
FIG. 13A is a partial cross-sectional side view of the mounting block and perforator quick disconnect perforator system of FIG. 10 in an unlocked condition.
Figure 13B:
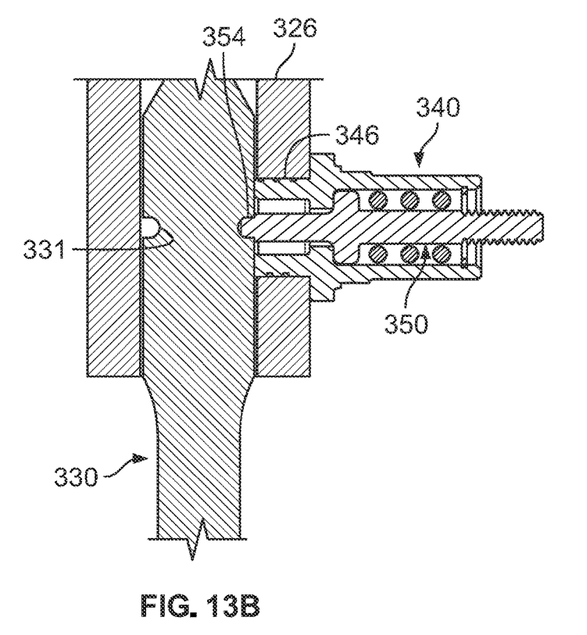
FIG. 13B is a partial cross-sectional side view of the mounting block and perforator quick disconnect system of FIG. 10 in a locked condition.

Housing 341 includes a body 342, a flange 343, and a threaded shaft or post 346. Body 342 defines a chamber 344 which houses a portion of piston 350 that includes flange 351. Threaded end 352 of piston 350 extends outwardly from an end of body 342. Threaded shaft 346 and flange 343 of housing 341 extend from another end of body 342. Threaded shaft 346 is configured to threadedly engage second opening 324 in mounting block 310 while flange 343 bears on mounting block 320 to help secure retaining device 340 in place. In this regard, threaded shaft 346 is a connector of retaining device 340 which connects retaining device 340 to mounting block 320. Engagement end 354 of piston 350 extends from chamber 344, through an intermediate wall 347 aligned with flange 343, and through threaded shaft 346 so that engagement end 354 projects from housing 341 in a locked configuration or first position of male component 350, as shown in FIG. 13B. However, in an unlocked configuration or second position of male component 350, the spring bias is overcome via operator input and engagement end 354 is retracted into housing 341, as shown in FIG. 13A, thereby allowing perforator 330 to be removed.

Figure 13C:
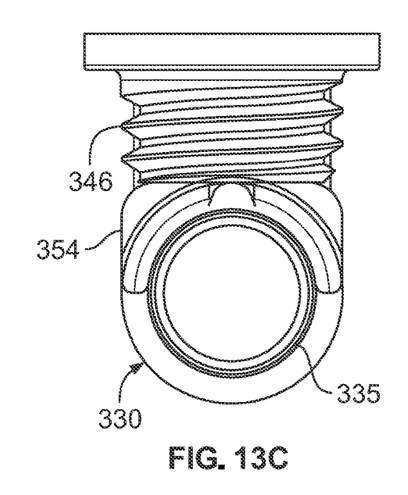
FIG. 13C is a partial cross-sectional top view of the perforator quick disconnect mechanism system of FIG. 10 in the locked condition.

As mentioned, mounting block 320 can be retrofitted with system 310. In this regard, a bolt or other threaded fastener may be removed from second opening 324. Retaining device 340 is then engaged to second opening 324 by threading threaded shaft 346 to second opening 324. At this point, perforator 330 can then be secured to mounting block 320 via retaining device 340. In this regard, head 332 of perforator 330 is inserted into first opening 322 so that second engagement feature 350 can lockingly engage first engagement feature 331. In other words, head 332 of perforator 330 is inserted axially into first opening 322. At this point, end effector 354 already projects into first opening 322 under its spring bias. Thus, as perforator 330 is advanced into first opening 322, cam surface 334 of perforator engages end effector 354 and pushes it back toward housing 341 against the spring bias. Once groove 331 (i.e., female component) aligns with end effector 354 (i.e., male component), end effector 354 snaps into groove 331 and bears against inner shaft 335 which secures perforator 330. Where it is desirable to remove perforator 330, piston 350 is pulled back via threaded end 352 which releases perforator 330 so that it can be removed from first opening 322.

Figure 14A:
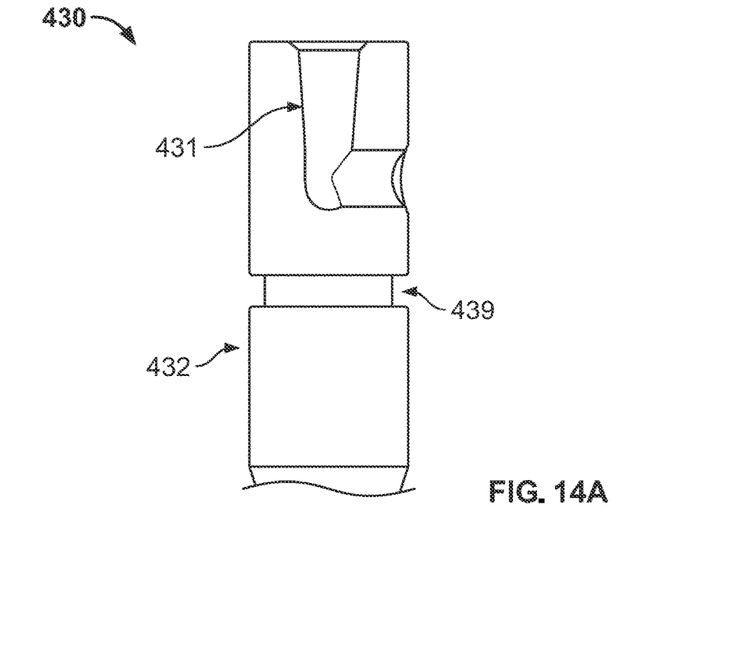
FIG. 14A is a partial perspective view of a perforator according to a still further embodiment of the present disclosure.
Figure 14B:
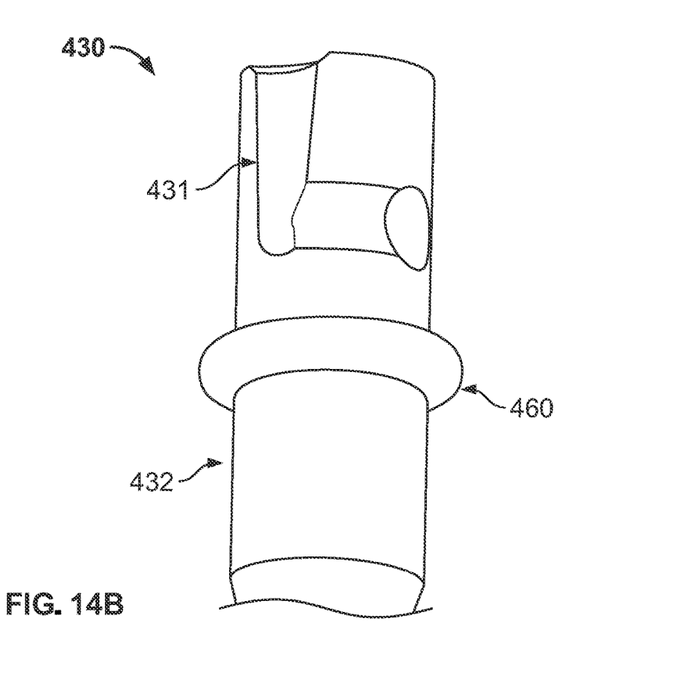
FIG. 14B is a partial perspective view of the perforator of FIG. 14A including an O-ring connected thereto.

FIGS. 14A and 14B illustrate a perforator 430 according to a still further embodiment of the present disclosure. Perforator 430 has a head 432 configured to receive an O-ring 460. In this regard, head has a female component 431 and a circumferential groove 439 disposed distal of or beneath female component 431. As shown in FIG. 14B, O-ring 460 may be positioned within circumferential groove 439 which can help stabilize perforator 430 from wobbling within a mounting block, such as mounting blocks 20, 120, 220, and 230. While head 432 is depicted as having the same female component 431 as perforator 430, it should be understood that perforator 430 may have any of the aforementioned female components. In other words, any of the aforementioned perforator embodiments may be configured to receive an O-ring.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A perforator quick disconnect system for retrofitting a mounting block of an aerator device, comprising:

a perforator having a body, a tip extending from an end of the body, and a head extending from another end of the body, the head having an exterior dimensioned to be received within the mounting block and a female component extending into the exterior of the head; and a retaining device having a connector configured to connect to the mounting block and a male component disposed at least partially within the connector and moveable relative thereto from a first position to a second position, wherein the female component of the perforator and the male component of the retaining device together form a quick disconnect mechanism such that, when the perforator and retaining device are received by the mounting block, movement of the male component from the second position to the first position secures the retaining device to the mounting block, wherein the female component includes a first groove extending in a first direction and a second groove extending in a second direction, and wherein the female component includes a first and a second depressions, the first depression being located at an intersection between the first and second grooves, the second depression being located at an end of the second groove opposite that of the first depression.

2. The system of claim 1, wherein the male component is spring biased toward the first position.

3. The system of claim 1, wherein the perforator includes an axial opening extending through the tip and into the body.

4. The system of claim 1, further comprising an O-ring, and wherein the head of the perforator includes a groove configured to receive a portion of the O-ring.

5. The system of claim 1, wherein the first direction is a proximal-distal direction, and the second direction is perpendicular to the first direction.

6. The system of claim 1, wherein the second groove is arcuate and extends about an axis of curvature parallel to or coaxial with a longitudinal axis of the head.

7. The system of claim 1, wherein the first and second depressions each have a depth greater than a depth of the second groove.

8. The system of claim 7, wherein the male component includes a plunger biased in the first position and is configured to travel through the female component, the depths of the first and second grooves and first and second depressions relative to one another being such that the plunger is in the second position when located within the first and second grooves and in the first position when located within the first and second depressions.

9. The system of claim 1, wherein the female component includes a groove extending circumferentially about a longitudinal axis of the head.

10. The system of claim 8, wherein the connector includes a threaded shaft and a housing extending from the threaded shaft, and the male component includes a piston housed within the housing and moveable relative thereto between the first and second positions, the piston being biased toward the first position.

11. The system of claim 9, wherein the piston includes a C-shaped end effector configured to be received within the circumferential groove of the perforator.

12. A perforator quick disconnect system for retrofitting to a mounting block of an aerator device, comprising:

a perforator having a body, a tip extending from an end of the body, and a head extending from another end of the body, the head having an exterior dimensioned to be received within the mounting block and a female component extending into the exterior of the head; and a retaining device having a first end portion configured to be received within the mounting block and a male component moveable relative to the first end portion between a first position and a second position, wherein the female component of the perforator and the male component of the retaining device together form a quick disconnect mechanism such that, when the perforator and retaining device are received by the mounting block, movement of the male component from the second position to the first position secures the retaining device to the mounting block, wherein the female component includes an L-shaped groove, and wherein the female component includes a first and a second depressions, the first depression being located at an intersection between first and second grooves of the L-shaped groove, the second depression being located at an end of the second groove opposite that of the first depression.

13. The system of claim 12, wherein the male component includes a spring biased plunger.

14. A perforator for quick connection and disconnection with a mounting block of an aerator, comprising:

a body having a first end, a second end, and a length extending between the first and second ends and defining a longitudinal axis of the body;

a tip extending from the first end of the body; and a head extending from the second end of the body, the head having an exterior and a female component of a quick disconnect mechanism extending into the exterior, the female component having at least a first groove extending about an axis of rotation that extends parallel to or coaxial with the longitudinal axis of the body, wherein the female component includes a second groove intersecting the first groove, and wherein the female component includes a first and second depression, the first depression being located at an intersection between the first and second grooves, the second depression being located at an end of the second groove opposite that of the first depression.

* * * * *